United States Patent
Radbrant et al.

(10) Patent No.: US 8,228,694 B2
(45) Date of Patent: Jul. 24, 2012

(54) CONVERTER STATION AND A METHOD FOR CONTROL THEREOF

(75) Inventors: Ulf Radbrant, Ludvika (SE); Bernt Bergdahl, Ludvika (SE)

(73) Assignee: ABB Technology Ltd., Zürich (CH)

( * ) Notice: Subject to any disclaimer, the term of this patent is extended or adjusted under 35 U.S.C. 154(b) by 904 days.

(21) Appl. No.: 12/161,908

(22) PCT Filed: Jun. 15, 2006

(86) PCT No.: PCT/SE2006/000714
§ 371 (c)(1),
(2), (4) Date: Dec. 1, 2008

(87) PCT Pub. No.: WO2007/084037
PCT Pub. Date: Jul. 26, 2007

(65) Prior Publication Data
US 2009/0303761 A1    Dec. 10, 2009

Related U.S. Application Data

(60) Provisional application No. 60/760,948, filed on Jan. 23, 2006.

(51) Int. Cl.
*H02H 7/125* (2006.01)
*H02M 7/12* (2006.01)
*H05K 7/20* (2006.01)

(52) U.S. Cl. ............................ 363/51; 363/125; 363/141

(58) Field of Classification Search .................. 361/103; 363/35, 37, 51, 52, 84, 125, 141
See application file for complete search history.

(56) References Cited

U.S. PATENT DOCUMENTS

| | | | |
|---|---|---|---|
| 3,824,857 A | | 7/1974 | Smith |
| 4,117,527 A | | 9/1978 | Demarest et al. |
| 4,173,780 A | * | 11/1979 | Hausler et al. ................... 363/51 |
| 6,084,787 A | * | 7/2000 | Nyberg et al. .................... 363/51 |
| 6,185,116 B1 | * | 2/2001 | Åstrom et al. .................... 363/51 |
| 2005/0286274 A1 | * | 12/2005 | Pfitzer et al. ..................... 363/37 |

FOREIGN PATENT DOCUMENTS

EP    0736949 A1    10/1996
RU    2 183 570 C1    6/2002
(Continued)

OTHER PUBLICATIONS

PCT/ISA/210—International Search Report—Oct. 13, 2006.
(Continued)

*Primary Examiner* — Adolf Berhane
*Assistant Examiner* — Fred E Finch, III
(74) *Attorney, Agent, or Firm* — Venable LLP (57) ABSTRACT

A converter station an element adapted to determine a value of an actual temperature of any critical component of the station and an element adapted to determine a value of an actual temperature of any media used to cool the critical component. An arrangement is adapted to utilize these temperature values and information about actual cooling capacity of any cooling equipment present to cool the critical component and information about the thermal behavior of the critical component and the possible cooling media upon a possible change of the power actually transmitted through the station in a mathematical model for calculating the present overload capabilities of the converter station for use in the control of converters of the station upon a possible request of utilizing an overload capability of the station.

27 Claims, 2 Drawing Sheets

FOREIGN PATENT DOCUMENTS

| RU | 2 221 325 C2 | 7/2003 |
|---|---|---|
| WO | WO-9857407 A2 | 12/1998 |
| WO | WO-0067358 A1 | 11/2000 |
| WO | WO-0117085 A1 | 3/2001 |
| WO | WO-0117092 A1 | 3/2001 |
| WO | WO-2004012327 A1 | 2/2004 |

OTHER PUBLICATIONS

PCT/IPEA/409—International Preliminary Report on Patentability—Feb. 5, 2008.

European Patent Office Search Report, dated Dec. 8, 2010, issued in counterpart European Patent Application No. 06 74 7907.

Tenbohlen, S., et al., "Assessment of Overload Capacity of Power Transformers by On-line Monitoring Systems," *Power Engineering Society Winter Meeting*, vol. 1, pp. 329-334, Jan. 28, 2001.

Decision on Grant issued in counterpart Russian patent application 20058134512/09, Jan. 18, 2010.

* cited by examiner

CONVERTER STATION AND A METHOD FOR CONTROL THEREOF

CROSS-REFERENCE TO RELATED APPLICATIONS

This application claims priority to U.S. provisional patent application 60/760,948 filed 23 Jan. 2006 and is the national phase under 35 U.S.C. §371 of PCT/SE2006/000714 filed 15 Jun. 2006.

TECHNICAL FIELD OF THE INVENTION AND PRIOR ART

The present invention relates to a converter station for connecting an AC system to an HVDC transmission line, said station comprising at least one converter having a DC-side thereof connected on one hand to a pole of said transmission line on high potential and on the other to low potential and an AC-side connected to said AC system, said station comprising one or more component(-s) being critical in the meaning that a maximum allowed temperature of said component(-s) may be reached would the power transmitted through the converter station be raised above a rated power of the converter station defined as the maximum power allowed to be transmitted through the converter station at continuous operation and at a maximum ambient temperature, the station also comprising a control device adapted to control said converter for determining the level of power transmitted through the converter station and an overload limiting arrangement adapted to, based upon information about the ambient temperature prevailing, determine the overload capability of the converter station defined as how much more power than said rated power may be transmitted through the station for a certain period of time without exceeding said maximum allowed temperature of said component(-s) and deliver this information to said control device for being used thereby upon a possible request of utilizing this overload capability, as well as a method for controlling such a converter station.

The invention is not restricted to any particular levels of voltage between low potential (earth) and high potential of the HVDC (High Voltage Direct Current) transmission line, but it is especially applicable to such voltages above 500 kV. Neither is the invention restricted to any particular levels of currents through said transmission line, but said line is preferably rated for currents above 1 kA.

The components, such as current valves, converter transformers and smoothing reactors, of such an HVDC converter station are normally thermally designed for a rated power at a maximum ambient temperature, which means that a maximum allowed temperature, a rated hot-spot temperature, of said respective component may be reached would the power transmitted through the converter station be raised above this rated power at said maximum ambient temperature. However, at ambient temperatures being lower than said maximum ambient temperature, the cooling of a said component is more efficient and it is possible to increase the power transmitted through the converter station, i.e. the continuous current through a said component, without exceeding said rated hot-spot temperature thereof. This is called continuous overload capability of the converter station.

Also at maximum ambient temperature, it is possible to transmit more than said rated power for short times, which is called short time overload capability of the converter station. At ambient temperatures that are lower than the maximum ambient temperature it is possible to increase the short time overload capability further. Furthermore, for equipment with forced cooling it is possible to increase the overload levels if redundant cooling is available, which is the normal operation condition.

Those of said components of the converter station for which there is a risk that said maximum allowed temperature is reached would the power transmitted through the converter station be raised above said rated power of the converter station are here called critical components. The one of such critical components having the lowest overload capability under certain conditions will of course decide the overload capability of the converter station. Which this component is may depend upon the ambient temperature, duration and status of redundant cooling and other parameters.

HVDC transmission systems to which a converter station of this type belongs requires high utilization of the inherent overload capability.

Known such converter stations do therefor have a said overload limiting arrangement adapted to deliver information to the control device adapted to control said converter or converters of the station for using this overload capability when requested. Said arrangement has for this sake access to tables of continuous overload capability as well as short time overload capability for different periods of time, for different values of the ambient temperature. By measuring the ambient temperature it may be decided how much the power transmitted through the converter station may be raised above the rated power thereof for example two hours. The table may also contain overload capabilities for the case of redundant cooling and without redundant cooling. An example of such an overload table, in which said maximum ambient temperature is +40° C., is shown below.

| Ambient temp. | Continuous overload capability | | 2 hours overload capability | | 30 minutes overload capability | | 5 seconds overload capability | |
|---|---|---|---|---|---|---|---|---|
| | without redund. cooling | with redund. cooling | without redund. cooling | with redund. cooling | without redund. cooling | with redund. cooling | without redund. cooling | with redund. cooling |
| +40° C. (max) | 100% | 105% | 110% | 115% | 120% | 125% | 130% | 133% |
| +20° C. | 110% | 115% | 115% | 120% | 124% | 129% | 133% | 133% |
| 0° C. | 115% | 120% | 118% | 123% | 127% | 132% | 133% | 133% |

SUMMARY OF THE INVENTION

The object of the present invention is to provide a converter station and a method for controlling a converter station defined in the introduction, which makes it possible to increase the overload capability of the converter station with respect to such converter stations already known.

This object is according to the invention obtained by providing such a converter station with means adapted to determine a value of the actual temperature of said critical component(-s) and means adapted to determine a value of the actual temperature of any media used to cool said critical component(-s), and said arrangement is adapted to utilize these temperature values as well as information about actual cooling capacity of any cooling equipment present to cool said critical component(-s) and information about the thermal behaviour of said critical component(-s) and a said possible cooling media upon a possible change of the power actually transmitted through the station in a mathematical model for calculating the present overload capabilities of the converter station for use in the control of the control device upon a possible said request.

It is by this possible to estimate the actual said hot-spot temperatures of critical components and estimate the future hot-spot temperatures for different overload scenarios for these components. This means that it may be calculated how much more power may be transmitted through the converter station than said rated power for the conditions prevailing for the moment over a predetermined time, such as continuously or over a restricted time, for instance in the order of 1-5 hours. The utilization of the inherent overload capabilities of the converter station may by this be increased. It is also possible to present the present overload capabilities calculated to an operator of the converter station or the HVDC transmission system to which it belongs. The calculation is preferably carried out continuously by said arrangement for continuously presenting the actual overload capabilities of the converter station and utilizing these to a large extent.

According to an embodiment of the invention said station comprises a plurality of different critical components, and said arrangement is adapted to carry out a said calculation of overload capabilities for each of said critical components and determine the lowest overload capabilities so obtained as the converter station overload capabilities.

According to another embodiment of the invention said arrangement is adapted to calculate a continuous overload capability of the converter station defined as how much more power than said rated power may continuously without any restriction of time be transmitted through the station at the conditions prevailing of ambient temperature and cooling capacity of a said cooling medium. The actual continuous overload capability of the converter station may in this way be well utilized.

According to another embodiment of the invention said arrangement is adapted to calculate a short time overload capability of the converter station defined as how much more power than said rated power may be transmitted through the station for a restricted period of time without exceeding said maximum allowed temperature of said component(-s). It is by this calculation possible to utilize the actual overload capability of the converter station for a certain period of time, such as for example two hours, during which there is a particular need of maximally utilizing said overload capability. This may for instance be the case for a converter station of a bipolar HVDC transmission system when the operation of the station changes from bipolar to monopolar as a consequence of for instance an earth fault on one of the poles. This means that the reduction of power as a consequence of the trip of one pole may be counteracted, so that it may for instance be 30% instead of 50% making said trip less severe.

According to another embodiment of the invention said means adapted to determine a value of the actual temperature of any media used to cool said critical component(-s) comprises means adapted to measure the temperature of said cooling media. This means that the actual overload capability of the converter station may be more reliably determined than would the temperature of said cooling media only be estimated, for instance based upon the value of the ambient temperature and the current through the station.

According to another embodiment of the invention said means adapted to determine a value of the actual temperature of said critical component(-s) is adapted to determine said temperature value by a calculation thereof based upon information about the actual temperature of said cooling media and said cooling capacity of any cooling equipment. This means a rather accurate way of determining the actual temperature of said critical component(-s), so that the overload capabilities of the converter station may be reliably calculated.

According to another embodiment of the invention the converter station comprises means adapted to measure the current through said critical component(-s), and said arrangement is adapted to base the calculation of the present overload capabilities of the converter station also upon information about the value of said current. This will increase the reliability of the calculation of the actual overload capabilities of the converter station further.

According to another embodiment of the invention said arrangement is adapted to base the calculation of the present overload capabilities of the converter station also upon a thermal time constant of said cooling media and/or of said critical component(-s). This will increase the reliability of the calculation of the actual overload capabilities of the converter station further.

According to another embodiment of the invention said arrangement is adapted to use a mathematical model in the form of a thermal model of a relation of a temperature increase of a said cooling media versus the current through said critical component(-s) for calculating a development of the temperature of said critical component(-s) and by that determine a level of power that may be transmitted through the converter station for different periods of time as of the moment of said calculation. A thermal model of such a relationship between an increase of the current through said critical component(-s) and a temperature increase of said cooling media improves the possibilities of reliably calculating the actual overload capabilities of the converter station in each moment of the operation thereof.

According to another embodiment of the invention said arrangement is adapted to calculate which current through a said critical component(-s) and by that which power transmitted through the station will give a certain maximum allowed temperature of said critical component(-s) within a predetermined period of time. This means that it may for instance be calculated that an overload of 40% will result in an arrival of said maximum allowed temperature of the critical component within 30 minutes, whereas said maximum allowed temperature will be reached after two hours for an overload of 25%. It may then be decided by the operator which way of controlling the converter or converters will be most suitably in the actual case.

According to another embodiment of the invention said converter station comprises at least one transformer on the AC-side of said converter and said critical component(-s), and the windings of said transformer are oil-insulated and immersed in a cooling media in the form of an oil bath, and said means adapted to determine a value of the actual temperature of any media used to cool said critical component is adapted to measure the temperature of said oil.

In another embodiment of the invention power semiconductor devices of converter valves are other said critical component(-s). The arrangement is then adapted to base said calculation upon a measurement of the direct current flowing through said converter valves and/or the voltage across said converter valves and/or the temperature of a cooling liquid, such as water, used for cooling the valves and/or the control angle of thyristors of the valves when thyristors are used as power semiconductor devices in the valves and/or the overlap angle, i.e. the period during which two parallel valves both are conducting current.

According to another embodiment of the invention smoothing reactors of the converter station are said critical component(-s). These smoothing reactors may then be air insulated and cooled by ambient air and said arrangement is then adapted to utilize results of measurements of the ambient temperature and the current through a said reactor for calculating said overload capability of said reactors.

According to another embodiment of the invention said arrangement is adapted to carry out said calculation of said present overload capabilities of the converter station while utilizing data stored in the form of results of a temperature rise test of said critical component(-s) with said cooling media and possible cooling equipment, through which both a final temperature rise and a thermal time constant have been determined for said critical component(-s) and/or said cooling media. This means that the reliability of the calculation of said overload capabilities of the converter station may be increased further.

The invention also relates to a method for controlling a converter station and the features and advantages thereof and of the embodiments of this method appear from the above discussion of the converter station according to the invention.

The invention also relates to a computer program and a computer readable medium. It is easy to understand that the method according to the invention is well suited to be carried out through program instructions from a processor which may be influenced by a computer program provided with the program steps in question.

Further advantages as well as advantageous features of the invention will appear from the following description.

BRIEF DESCRIPTION OF THE DRAWINGS

With reference to the appended drawings, below follows a specific description of embodiments of the invention cited as examples.

In the drawings.

DETAILED DESCRIPTION OF EMBODIMENTS OF THE INVENTION

Figure 1:
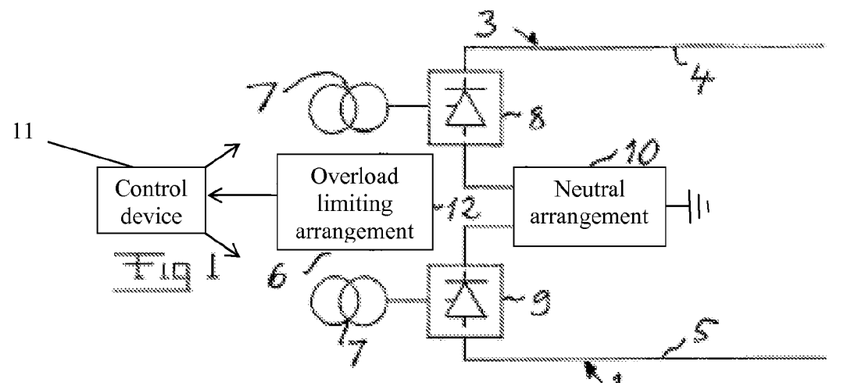
FIG. 1 is a very schematic view illustrating the general structure of an HVDC transmission system having a converter station according to an embodiment of the present invention.

The general design of an HVDC transmission system to which a converter station according to an embodiment of the invention belongs is schematically shown in FIG. 1. A converter station 1 is arranged at each end of an HVDC transmission line 3 having two poles, one 4 with positive and one 5 with negative polarity. For the sake of clearness only one of the stations is shown in the figure. The other has a corresponding structure, and is here assumed to operate as an inverter, whereas the station 1 is intended to operate as a rectifier. An AC system 6 is connected to each converter station through transformers 7 for obtaining a suitable level of the voltage of the DC system. The AC system may be a generating system in the form of any type of power plant with generators of electricity or a consuming system or network connecting to consumers of electric power, such as industries and communities. Each converter station has two converters 8, 9 each having a DC-side thereof connected on one hand to a respective of said two poles 4, 5 and on the other to a DC neutral arrangement 10 in common to the converters and connecting the low voltage side thereof to earth for defining a certain voltage across each converter. Each converter 8, 9 may be replaced by a set of converters, such as two or three connected in series for obtaining high voltages, such as in the order of 800 kV. The converters include a number of current valves in any known configuration, for instance in a 12-pulse bridge configuration. The converters may be line commutated Current Source Converters in which the switching elements, such as thyristors, are turned off at zero crossing of the AC current in said AC system. The converters may also be forced commutated Voltage Source Converters, in which said switching elements are turn-off devices controlled according to a Pulse Width Modulation (PWM) pattern.

It is schematically shown for the converter station 1 that this also comprises a control device 11 adapted to control the converters for determining the level of power transmitted through the converter station 1. An overload limiting arrangement 12 is also included in the station and adapted to, based upon information about the ambient temperature prevailing, determine the overload capability of the converter station defined as how much more power than a rated power may be transmitted through the station for a certain period of time without exceeding a maximum allowed temperature of any critical component of the station and deliver this information to said control device 11 for being used thereby upon a possible request of utilizing this overload capability. The definition of critical components is that a maximum allowed temperature of these components may be reached would the power transmitted through the converter station be raised above said rated power of the converter station, which is defined as the maximum power allowed to be transmitted through the converter station at continuous operation and at a maximum ambient temperature, for instance +40° C.

Said critical components are typically for a converter station of this type said current valves of the converters 8, 9, said transformers 7 and smoothing reactors connected to the converters. The lowest overload capability for each of these critical components will be the overload capability of the converter station, and this will be different for each combination of ambient temperature, duration and status of any equipment used to cool these critical components.

Figure 2:
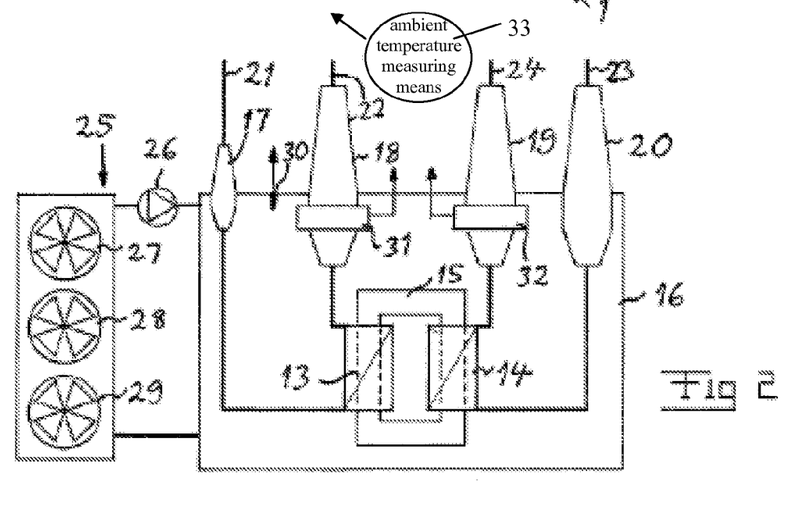
FIG. 2 is a simplified view of a converter transformer in a converter station according to an embodiment of the invention.

FIG. 2 shows a said critical component of the converter station in the form of a transformer 7. This has a primary winding 13 and a secondary winding 14 wound around a core 15 and oil-insulated by being immersed into an oil bath 16. Bushings 17-20 connect to low voltage 21 and high voltage 22 primary terminals and low voltage 23 and high voltage 24 secondary terminals. The oil of the oil bath is cooled by a number of cooling groups 25 distributed around the oil bath and of which one is shown in the figure. The cooling group comprises an oil pump 26 pumping oil from the oil bath past a number of fans 27-29 through which the oil is cooled by heat exchange with the air transported by the fans and then led back to the oil bath again. Means 30 are arranged for measuring the temperature of the oil at the top of the oil bath. Means 31, 32 are also arranged for measuring the current through the primary winding 13 and the secondary winding 14, respectively, of the transformer. Information from said means 30, 31 and 32 as well as an ambient temperature measuring means 33 are sent to said arrangement 12. The temperature at stake is here the temperature at the hottest spot of said winding. The actual temperature of the windings may be calculated from the top oil temperature. This calculation is based on the measured current and a model of the thermal behaviour of the windings and the cooling media, i.e. the oil bath. This model should be based on the results of a temperature rise test, where both the final temperature rise and the thermal time constant can be defined. Said arrangement 12 also contains a thermal model of the temperature rise of the oil (compared to ambient temperature), as function of the currents. That model is based on said temperature rise test, where both the final temperature rise and the thermal time constant for the oil can be defined. That model can later be adjusted after analyze of converter operation due to continuous measurement of the top oil temperature.

Figure 3:
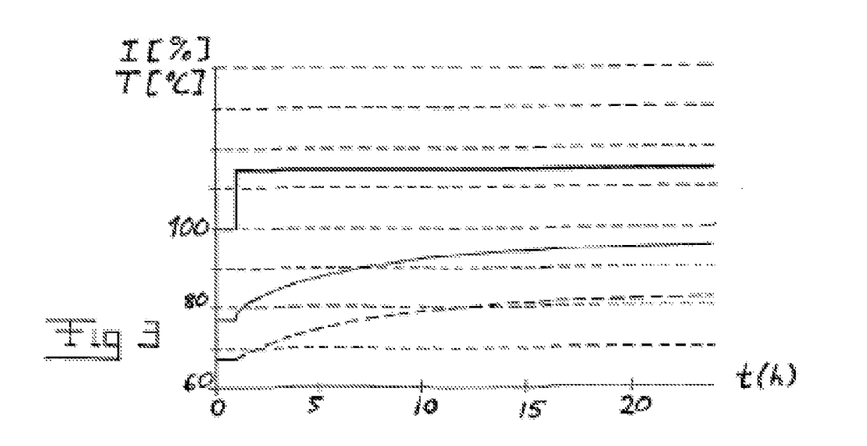
FIG. 3 is a graph showing a continuous overload scenario for a transformer according to FIG. 2 in a converter station according to the invention.

By using such thermal behaviour models of both oil and winding hot-spot temperature, possible overload levels can be calculated based on the actual ambient temperature and the actual cooling capacity, i.e. based on the number of cooling groups available. FIG. 3 illustrates how this may be used for increasing the power transmitted through the converter station over a longer time (continuously) above said rated power. The current is here proportional to said power transmitted and a current of 100% is defined to correspond to a transmission of said rated power through the station. The current through the windings is by a solid thick line shown in percent of the current corresponding to said rated power versus time, whereas the winding temperature is shown through a solid thinner line and the oil temperature through a dashed line in degrees Celsius versus time. The maximum allowed temperature for the windings is here assumed to be +95° C. Said arrangement calculates by using said thermal behaviour model and information about the ambient temperature a continuous overload capability of the converter station having said transformer as the most critical component defined as how much more power than said rated power may be continuously without any restriction of time be transmitted through the station at the conditions prevailing. This continuous overload capability is here calculated to be 15%, so that the current is raised to 115% of the so-called rated current. Thus, said overload limiting arrangement calculates the current that gives a certain final hot-spot temperature of the winding when both oil and winding temperatures have settled.

Figure 4:
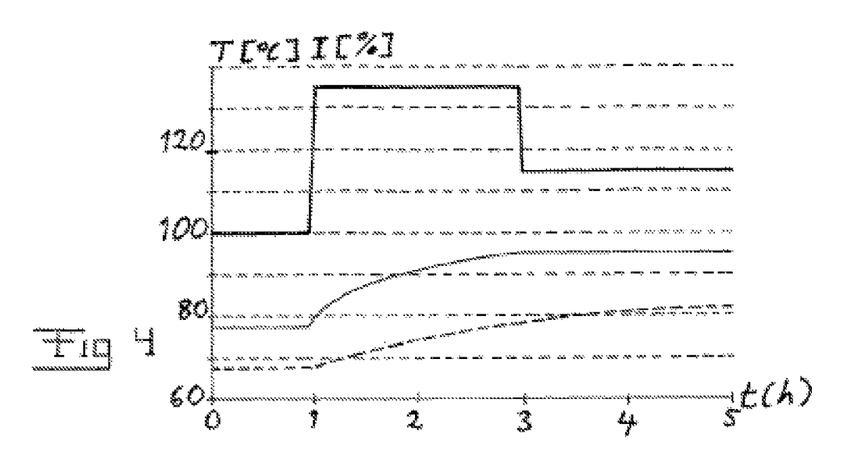
FIG. 4 is a graph showing a short time overload scenario for a transformer according to FIG. 2 in a converter station according to the invention.

The overload limiting arrangement may also calculate a short time overload capability of the converter station defined as how much more power than said rated power may be transmitted through the station for a restricted period of time without exceeding the maximum allowed temperature of the windings. This may be done for different such restricted periods of time depending on each situation, for instance for one hour or two and a half hours, and it is shown in FIG. 4 how such a short time overload capability calculated for two hours may be utilized. It has in this case been calculated that it is possible to conduct a current of 135% of said rated current through the windings in two hours starting from a certain state of the transformer before the temperature of the windings reach said maximum allowed temperature of +95° C. After these two hours a calculated continuous overload capability may still be used for conducting 115% of the rated current through the station. It is particularly advantageous to use such a short time overload capability would one of the two poles be tripped through for instance an earth fault, so that the converter station will change from bipolar operation to monopolar operation. By utilizing said short time overload capability in this way the power transmitted through the converter station will only be reduced to 67% of the bipolar power instead of to 50%.

Figure 5:
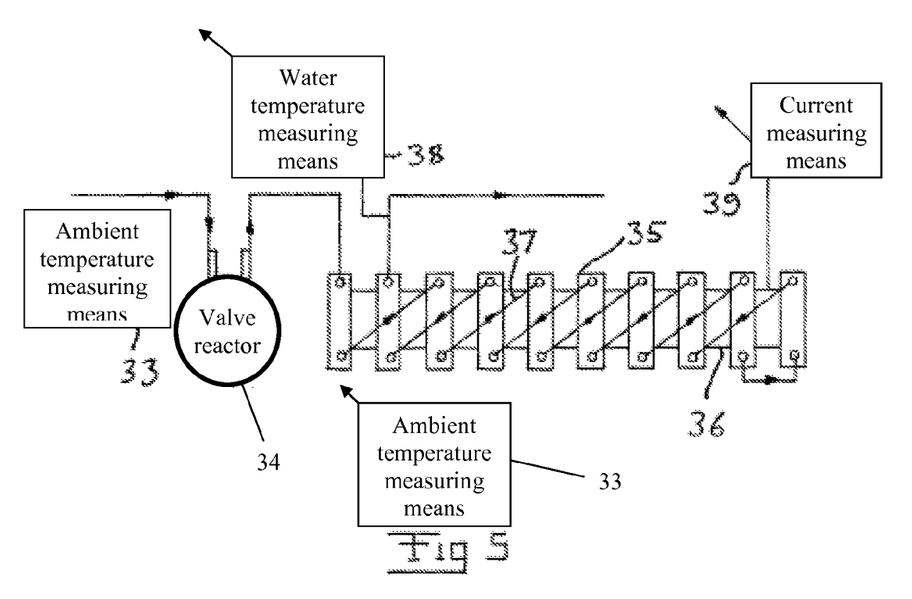
FIG. 5 is a very schematic view illustrating critical components in a converter station according to an embodiment of the invention in the form of a valve reactor and thyristors of a current valve.

FIG. 5 illustrates two other possible critical components of the converter station for which said overload limiting arrangement 12 may carry out corresponding calculations for determining continuous overload capabilities and short time overload capabilities thereof. One of these components is a valve reactor 34, which may be air insulated and cooled by convection to the ambience and possibly also cooled through heat exchange with water conducted therethrough. The other critical component is a current valve 35 having a number of semiconductor devices 36, here thyristors, connected in series in a stack. Cooling water is conducted along these thyristors 36 for cooling them as shown through the lines 37 with arrows. Means 38 are arranged to measure the temperature of the water leaving the current valve for being used for said calculation and for determining the temperature of the converter through a thermal model also using information about the current through the thyristors delivered by a current measuring means 39. The overload limiting arrangement may base the calculation of the overload capabilities with respect to the current valve besides the measurement of the direct current flowing through the valve and the temperature of the cooling liquid also upon possible measurement of the voltage across the converter valve, the control angle of thyristors of the valve and the overlap angle, i.e. the period during which two parallel valves both are conducting current.

It is possible that the overload capability information delivered through said arrangement as a result of said calculation is used by said control device to automatically utilize this overload capability, for instance always the continuous overload capability so calculated, possibly except for a suddenly occurring monopolar operation of the station, in which short time overload capabilities calculated are used. However, it is also possible that the arrangement only presents the results of the calculations to an operator of the converter station, which then decides how to use this information. The decision of the operator may be dependent upon a number of parameters, such as actual power consumption of a major consuming network connected to said AC-side of the station, the actual ability to generate power of a power plant connected to the converter station, the electric energy price on the spot market and so on.

The invention is not in any way restricted to the embodiments thereof described above, but many possibilities to modifications thereof would be apparent to a person with ordinary skill in the art without departing from the basic idea of the invention as defined in the appended claims.

It is for instance possible that a converter station according to the invention has other components being more critical than those described above, for instance any filter.

The invention claimed is:

1. A converter station connected between an AC system and an HVDC transmission line, said station comprising
at least one converter having a DC-side thereof connected to a pole of said transmission line on high potential and to low potential and an AC-side connected to said AC system,
a plurality of critical components comprising at least one transformer arranged on the AC-side of said converter and converter valves comprising power semiconductor devices, wherein a maximum allowed temperature of said critical components may be reached if power transmitted through the converter station be raised above a rated power of the converter station defined as the maximum power allowed to be transmitted through the converter station at continuous operation and at a maximum ambient temperature, a control device adapted to control said at least one converter for determining a level of power transmitted through the converter station, an overload limiting arrangement adapted to, based upon information about an ambient temperature prevailing, determine an overload capability of the converter station defined as how much more power than said rated power may be transmitted through the station for a certain period of time without exceeding said maximum allowed temperature of said critical components and deliver this information to said control device for being used thereby upon a possible request of utilizing this overload capability, wherein said overload limiting arrangement is adapted to carry out said calculation of overload capabilities for each of said critical components and determine lowest overload capabilities so obtained as the converter station overload capabilities, an element adapted to determine a value of an actual temperature of said critical components, and an element adapted to determine a value of an actual temperature of any media used to cool said critical components, wherein said overload limiting arrangement is adapted to utilize these temperature values as well as information about actual cooling capacity of any cooling equipment present to cool said critical components and information about a thermal behavior of said critical components and said any media used to cool said critical components upon a possible change of power actually transmitted through the station in a mathematical model for calculating present overload capabilities of the converter station for use in control of the control device upon a possible said request.

2. The converter station according to claim 1, wherein said overload limiting arrangement is adapted to continuously calculate said present overload capabilities.

3. The converter station according to claim 1, wherein said overload limiting arrangement is adapted to calculate a continuous overload capability of the converter station defined as how much more power than said rated power may continuously without any restriction of time be transmitted through the station at the conditions prevailing of ambient temperature and cooling capacity of said cooling medium.

4. The converter station according to claim 1, wherein said overload limiting arrangement is adapted to calculate a short time overload capability of the converter station defined as how much more power than said rated power may be transmitted through the station for a restricted period of time without exceeding said maximum allowed temperature of said critical components.

5. The converter station according to claim 4, wherein said station is designed to connect an AC system to an HVDC bipolar transmission line through two converters, wherein said control device is adapted to utilize information about said short time overload capability of the station calculated for controlling said converter for determining a level of power to be transmitted through the station above said rated power allowed for a certain period of time, upon changing from bipolar operation of the station to monopolar operation thereof.

6. The converter station according to claim 1, wherein the element adapted to determine a value of the actual temperature of any media used to cool said critical components comprise an element adapted to measure the temperature of said cooling media.

7. The converter station according to claim 6, wherein the element adapted to determine a value of the actual temperature of said critical components are adapted to determine said temperature value by a calculation thereof based upon information about the actual temperature of said cooling media and said cooling capacity of any cooling equipment.

8. The converter station according to claim 7, further comprising:

an element adapted to measure the current through said critical components, wherein said overload limiting arrangement is adapted to base the calculation of the present overload capabilities of the converter station also upon information about the value of said current.

9. The converter station according to claim 8, wherein said overload limiting arrangement is adapted to base the calculation of the present overload capabilities of the converter station also upon a thermal time constant of said cooling media and/or of said critical components.

10. The converter station according to claim 1, wherein said overload limiting arrangement is adapted to use a mathematical model in the form of a thermal model of a relation of a temperature increase of said cooling media versus the current through said critical components for calculating a development of the temperature of said critical components and by that determine a level of power that may be transmitted through the converter station for different periods of time as of the moment of said calculation.

11. The converter station according to claim 1, wherein said overload limiting arrangement is adapted to calculate which current through said critical components and by that which power transmitted through the station will give a certain maximum allowed temperature of said critical components within a predetermined period of time.

12. The converter station according to claim 1, wherein windings of said at least one transformer are oil-insulated and immersed in a cooling media comprising an oil bath, and wherein said element adapted to determine a value of the actual temperature of any media used to cool said critical components are adapted to measure the temperature of said oil.

13. The converter station according to claim 1, wherein said overload limiting arrangement is adapted to base said calculation upon a measurement of the direct current flowing through said converter valves and/or the voltage across said converter valves and/or the temperature of a cooling liquid, used for cooling the valves and/or the control angle of thyristors of the valves when thyristors are used as power semiconductor devices in the valves and/or the overlap angle, during which two parallel valves both are conducting current.

14. The converter station according to claim 1, wherein the critical components comprise valve reactors.

15. The converter station according to claim 14, wherein said valve reactors are air insulated and cooled by ambient air and said overload limiting arrangement is adapted to utilize results of measurements of the ambient temperature and the current through said reactor for calculating said overload capability of said reactors.

16. The converter station according to claim 1, wherein said overload limiting arrangement is adapted to carry out said calculation of said present overload capabilities of the converter station while utilizing data stored in the form of results of a temperature rise test of said critical components with said cooling media and possible cooling equipment, through which both a final temperature rise and a thermal time constant have been determined for said critical components and/or said cooling media.

17. A method for controlling a converter station connected between an AC system and an HVDC transmission line, said station comprising at least one converter having a DC side thereof connected to a pole of said transmission line on high potential and to low potential and an AC side connected to said AC system, said station comprising a plurality of critical components comprising at least one transformer arranged on the AC-side of said converter and converter valves comprising power semiconductor devices, wherein a maximum allowed temperature of said critical components may be reached if power transmitted through the converter station be raised above a rated power of the converter station defined as the maximum power allowed to be transmitted through the converter station at continuous operation and at a maximum ambient temperature, the method comprising:

controlling said converter for determining the level of power transmitted through the converter station, determining, based upon information about the ambient temperature prevailing, the overload capability of the converter station defined as how much more power than said rated power may be transmitted through the station for a certain period of time without exceeding said maximum allowed temperature of said critical components, wherein said calculation of overload capabilities is carried out for each of said critical components and the lowest overload capabilities so obtained are determined as the converter station overload capabilities, utilizing the information for said control of said converter upon a possible request of utilizing this overload capability, determining a value of the actual temperature of said critical components, determining a value of the actual temperature of any media used to cool said critical components, and utilizing the temperature values and information about actual cooling capacity of any cooling equipment present to cool said critical components and information about the thermal behavior of said critical components and said any media used to cool said critical components upon a possible change of the power actually transmitted through the station in a mathematical model for calculating the present overload capabilities of the converter station for use in said control upon a possible said request.

18. The method according to claim 17, wherein said present overload capabilities are continuously calculated.

19. The method according to claim 17, further comprising:
calculating a continuous overload capability of the converter station defined as how much more power than said rated power may be continuously without any restriction of time be transmitted through the station at the conditions prevailing of ambient temperature and cooling capacity of said cooling medium.

20. The method according to according to claim 17, further comprising:
calculating a short time overload capability of the converter station defined as how much more power than said rated power may be transmitted through the station for a restricted period of time without exceeding said maximum allowed temperature of said critical components.

21. The method according to claim 20, wherein the method is carried out for a station designed to connect an AC system to an HVDC bipolar transmission line through two converters, the method further comprising:
utilizing information about said short time overload capability of the station calculated for controlling said converter for determining a level of power to be transmitted through the station above said rated power allowed for a certain period of time, upon changing from bipolar operation of the station to monopolar operation thereof.

22. The method according to claim 17, wherein a mathematical model in the form of a thermal model of a relation of a temperature increase of said cooling media versus the current through said critical components are used for calculating a development of the temperature of said critical components and by that determine a level of power that may be transmitted through the converter station for different periods of time as of the moment of said calculation.

23. The method according to claim 17, further comprising:
calculating which current through said critical components and by that which power transmitted through the station will give a certain maximum allowed temperature of said critical components within a predetermined period of time.

24. The method according to claim 17, wherein said calculation of said present overload capabilities of the converter station is carried out while utilizing data stored in the form of results of a temperature rise test of said critical components with said cooling media and possible cooling equipment, through which both a final temperature rise and a thermal time constant have been determined for said critical components and/or said cooling media.

25. A computer program product, comprising:
a non-transitory computer readable medium; and
computer program instructions recorded on the computer readable medium and executable by a processor for carrying out a method for controlling a converter station connected between an AC system and an HVDC transmission line, said station comprising at least one converter having a DC side thereof connected to a pole of said transmission line on high potential and to low potential and an AC side connected to said AC system, said station comprising a plurality of critical components a plurality of critical components comprising at least one transformer arranged on the AC-side of said converter and converter valves comprising power semiconductor devices, wherein a maximum allowed temperature of said critical components may be reached if power transmitted through the converter station be raised above a rated power of the converter station defined as the maximum power allowed to be transmitted through the converter station at continuous operation and at a maximum ambient temperature, the method comprising:

controlling said converter for determining the level of power transmitted through the converter station, determining, based upon information about the ambient temperature prevailing, the overload capability of the converter station defined as how much more power than said rated power may be transmitted through the station for a certain period of time without exceeding said maximum allowed temperature of said critical components, wherein said calculation of overload capabilities is carried out for each of said critical components and the lowest overload capabilities so obtained are determined as the converter station overload capabilities, utilizing the information for said control of said converter upon a possible request of utilizing this overload capability, determining a value of the actual temperature of said critical components,
determining a value of the actual temperature of any media used to cool said critical components, and
utilizing the temperature values and information about actual cooling capacity of any cooling equipment present to cool said critical components and information about the thermal behavior of said critical components and said any media used to cool said critical components upon a possible change of the power actually transmitted through the station in a mathematical model for calculating the present overload capabilities of the converter station for use in said control upon a possible said request.

26. The computer program product according to claim 25, wherein the computer program instructions are provided at least partially through a network.

27. The computer program product according to claim 26, wherein the network is the internet.

* * * * *